Aug. 26, 1969  T. KOLOBOW ET AL  3,463,728
DIALYSATE CAPACITY AUGMENTATION PROCESS
Filed April 28, 1967  2 Sheets-Sheet 1
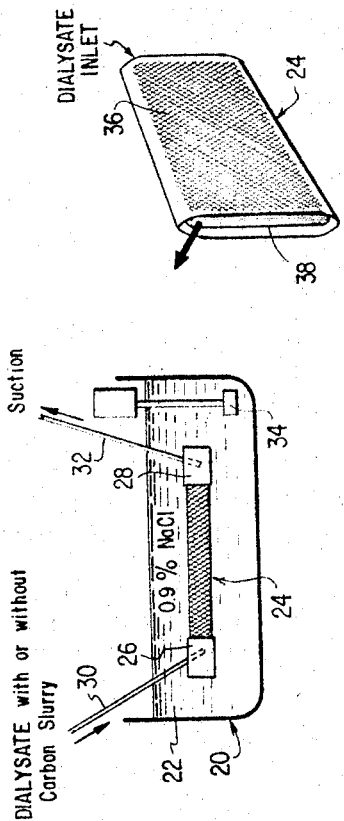
FIG. 1
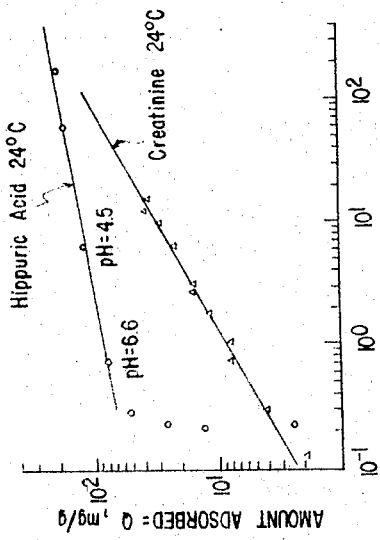
FIG. 2
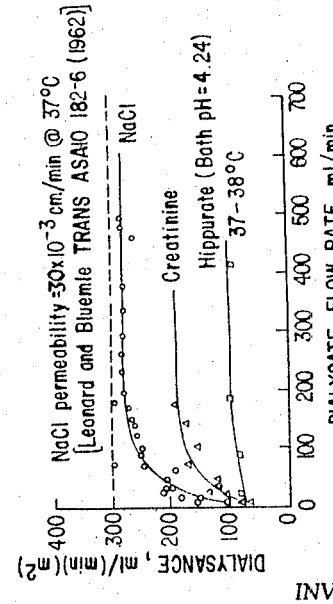
FIG. 3
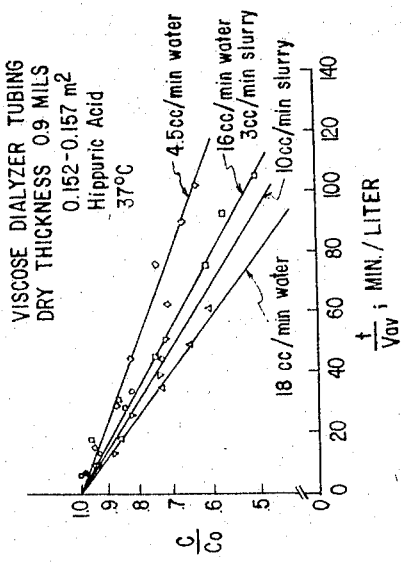
FIG. 4
FIG. 5
INVENTORS
THEODOR KOLOBOW
ROBERT L. DEDRICK
BY Jacobi & Davidson
ATTORNEYS

INVENTORS.
THEODOR KOLOBOW
ROBERT L. DEDRICK

BY *Jacobi & Davidson*

ATTORNEYS.

United States Patent Office 3,463,728
Patented Aug. 26, 1969

3,463,728
DIALYSATE CAPACITY AUGMENTATION PROCESS
Theodor Kolobow, Rockville, Md., and Robert L. Dedrick, McLean, Va., assignors to the United States of America as represented by the Secretary of the Department of Health, Education, and Welfare
Filed Apr. 28, 1967, Ser. No. 634,640
Int. Cl. B01d 13/00
U.S. Cl. 210—22                    11 Claims

ABSTRACT OF THE DISCLOSURE

Augmenting dialysate capacity for waste materials by adding thereto adsorbents for the waste materials. Specifically, a slurry of activated carbon of fine particle size is propelled past an artificial membrane in a dialyzing apparatus permitting the use of ultra-low dialysate flow rates and small quantities of dialysate. The technique is especially useful for artificial kidney applications.

---

This invention relates to dialysis in general and particularly to techniques for augmenting dialysate capacity. Although it will be understood that the instant inventive concepts are useful in many dialysis operations regardless of the material being dialyzed and the dialysate therefor, the most significant ramifications hereof relate to the ability to remove waste metabolites from blood whereby the major portion of the following descriptive matter will be particularly directed to this application.

Much research has been done in recent years aimed at the development and use of hemodialyzers or artificial kidneys. This research has been prompted by the fact that an estimated 100,000 people die each year in the United States from renal failure. The kidney plays a vital role in maintaining internal stability in the body even though there is constant physiological activity and radical changes in the external environment. Among the many physiological processes in which the kidney is involved are the removal of metabolic waste materials from the blood and the regulation of the body's electrolyte composition and acid-base balance. Thus, it will be seen that kidney or renal, failure can radically alter the physiological balance resulting in premature death. These important functions of the natural kidney can, to a great extent, be duplicated by the artificial kidney.

The mechanism by which the healthy kidney performs its functions is complex and largely unknown. In its most basic function, however, the metabolic waste materials, along with other material to be removed from the blood, flow to the urine to be excreted. In most artificial kidneys this function is duplicated by passing the blood, drawn from an artery, on one side of a semipermeable membrane, most commonly cellophane, and then back to the body through a vein. A buffered electrolyte solution, or dialysate, is passed on the other side of the semipermeable membrane. The dialysate usually contains electrolytes in concentrations similar to those found in normal blood plasma and is buffered to a pH approximating that of blood. Equilibration of blood and dialysate electrolyte and hydrogen ion concentration takes place and organic compounds as waste products of metabolism pass from the blood to the dialysate where they are diluted or carried away. The procedure just described, except for the materials involved and the necessary clinical precautions is nothing more than a simple dialysis.

While artificial kidneys are a valuable tool, presently available artificial kidney machines suffer from numerous disadvantages. In order to shorten the treating time with such devices, it is necessary to use a machine having a membrane of large surface area. Machines of this type are of high volume and high internal resistance requiring the use of blood pumps which often cause undesirable side effects. On the other hand, artificial kidney devices which do not require blood pumps are usually of low volume and reduced membrane surface area necessitating longer treatment periods. In either case, presently available artificial kidneys are generally extremely unwieldy, expensive, and complex in manufacture and in use.

Artificial kidneys generally fall into two categories, those in which the dialysate is recirculated and perodically changed, and those in which the dialysate is discarded after one use. Recirculation has the disadvantage of possible bacterial growth and is generally avoided unless extensive precautions are taken to eliminate contamination. However, in the absence of recirculation, very large quantities of dialysate are required. In either event, it is necessary with presently available artificial kidney devices to provide high dialysate flow rates for optimum use. With such requirements presently available hemodialyzers must be considered as relatively inefficient. In general an individual patient must be treated twice a week for from 6 to 12 hours at a time whereby large numbers of patients cannot be provided with necessary care.

A typical artificial kidney is the Kolff twin-coil kidney. This machine is approximately the size of a washing machine, and operates with 100 liters of fluid in the reservoir. Blood flows through a passageway and is in contact with a thin cellulose dialyzing membrane. A patient is treated with this machine twice a week for approximately 8 hours per treatment. Similarly, other conventional hemodialyzers use from 200–300 liters of dialysate per dialysis.

An ideal solution to many of the problems associated with the use of the presently available artificial kidneys would be the development of a low cost, portable hemodialyzer. Conceivably, a kidney small enough to be carried on the patient's person and efficient enough to be used continuously instead of intermittently could be developed. The kidney would be disposable in toto after each course of treatment. This may be accomplished if a method of reducing dialysate volume could be achieved.

Considerable research has been undertaken with a view toward a more immediately available improvement over present artificial kidney machines, that is, a device which is small enough and inexpensive enough to be used successfully by the patient in his home. As with the larger units presently available, the "home" artificial kidney would be intermittently used due to its bulk, but improvements in the efficiency of the dialysis procedure are intended to reduce the time necessary for an individual treatment. This, of course, would allow more patients to avail themselves of these lifesaving machines.

Recently, a relatively small artificial kidney was developed which eliminated some of the disadvantages of other prior art apparatus. This was reported by Kolobow et al. in Trans. Amer. Soc. Artif. Int. Organs, volume X, pages 116–120, 1964, and the description thereof is embodied herein by reference in its entirety.

The apparatus comprises a cylindrical support around which is placed at least one envelope which includes a polyethylene screen spacer sandwiched between a pair of cellophane membranes and with at least one silicone rubber dialysate inlet tube and at least one silicone rubber dialysate outlet tube, a silicone rubber jacket consolidating the support and the envelope means for blood to enter the kidney, and means for distributing the blood over the membranes of the envelope. Dialyzing fluid is passed within the tubular membrane at flow rates on the order of about 1000 cc./minute. While this apparatus is relatively inexpensive and is disposable it still has the disadvantage of requiring relatively large quantities of dialyzing fluid.

As has been mentioned previously, recirculation of the dialysate has been suggested, the metabolic wastes being removed prior to reuse. Such a technique would reduce the necessary volume of dialyzing fluid and would therefore appear to have some merit. It is well known that activated carbon may be used in a fixed bed to remove impurities from liquids and gases and therefore attempts were made to pass used dialysate through a fixed bed of activated carbon in order to remove the metabolic waste materials therefrom. Activated carbon particles of average diameters ranging from 0.199 to 2.84 millimeters were used, particles smaller than 0.199 millimeter in diameter being rigorously excluded as interfering with the experiments. This carbon did not reach equilibrium with the test solution in 20 minutes. The next step in the testing procedure was to determine whether the activated carbon could be regenerated. Suggestions were then made with a view to removing the metabolic waste from the dialyzing fluid by passing the same through a bed of activated carbon of relatively large particle size and then regenerating the carbon so that it may be reused. This method involved using a large bed of carbon, of the order of 1000 grams, to achieve acceptable results and also necessitated means for regenerating the carbon. Significant disadvantages of such procedures, in addition to their cumbersome nature, is the potential for bacterial growth on the carbon bed where the concentration of substances which promotes such growth would be high. In any event, procedures of this type are merely directed toward purifying dialysate so that it can be reused.

Surprisingly, it has now been found that when the dialysate itself is modified by adding thereto an effective quantity of an adsorbing medium for the metabolites, that capacity of the dialysate is increased to a point where satisfactory dialysis can be effected even at ultra-low dialysate flow rates. The significance of this phenomenon in the artificial kidney area is believed self-evident.

According to a preferred embodiment hereof the dialysate is augmented with a slurry of preferably less than 10 weight percent activated carbon of a mean particle size less than about 100 microns, preferably less than about 40 microns and in the optimum arrangement on the order of about 4 to 5 microns. Dialysate of this type can be propelled through a dialyzing apparatus at relatively low flow rates, generally less than about 100 cc./minute and as low as about 3 cc./minute with greatly improved dialysis. Thus, significantly smaller quantities of dialysate are required without the need for recirculation.

The method of the instant invention is especially useful in a dialysis apparatus such as the artificial kidney device disclosed in the aforementioned Kolobow et al. publication wherein the techniques hereof would be used to remove a variety of metabolites from blood. Among the many substances which could be removed, but by no means limiting, are creatinine, uric acid, indican, phenolic compounds, and organic acids such as hippuric acid.

While carbon is the preferred material it should be noted that other substances such as suitable exchange resins or gels could be used in this invention. The prime considerations in choosing these substances are fine particle size and capability of being propelled through a dialysis apparatus in the dialysate.

Urea adsorption, and therefore dialysis, is not significant with the use of activated carbon, but if urea were enzymatically degraded, the ammonia evolved could then be adsorbed with suitable exchange resins.

Accordingly, it is an object of this invention to provide an improved method of removing metabolic waste products and maintaining proper acid-base balance in body fluids such as blood. Further, it is an object of this invention to provide an improved method of hemodialysis which reduces the necessary volume of dialysate from about 300 liters per treatment to about 3 liters per treatment leading to the production of artificial kidneys which are relatively small in size when compared to currently available devices, low in cost, and disposable in toto after each course of treatment. More specifically, it is an object of this invention to provide an improved method of dialyzing blood in an artificial kidney which comprises augmenting the dialysate with a fine slurry of activated carbon of a particle size of up to 100 microns, more particularly less than 40 microns, and preferably of a mean particle size of 4–5 microns.

Other objects and advantages of this invention will be apparent from the following description, and the drawings wherein:

FIGURE 1 is a schematic view of the testing apparatus utilized in the examples set forth hereinafter;

FIGURE 2 is a perspective view of the membrane compartment thereof;

FIGURE 3 is a plot showing the dialysance of a membrane to certain substances at various flow rates;

FIGURE 4 is a plot showing adsorption isotherms of certain substances on activated carbon;

FIGURES 5, 6 and 7 are plots showing half-times at various dialysate flow rates and membrane surface areas;

Figure 7:
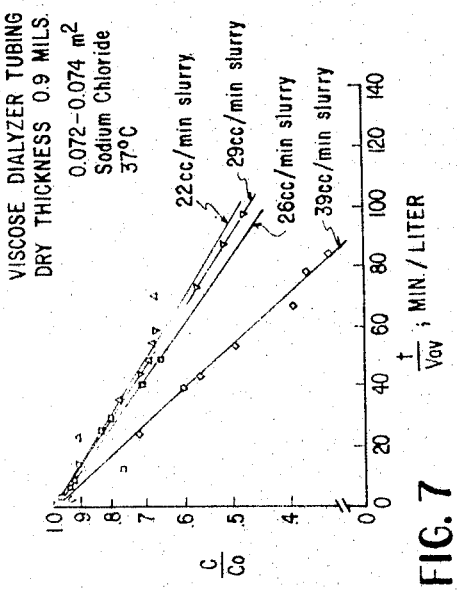

More specifically, FIGURE 1 shows a dialyzing apparatus which is, in effect, a section of the preferred artificial kidney disclosed in the aforementioned Kolobow et al. publication. In a container 20 was placed a solute solution in distilled water 22 representing a synthetic "blood" bath, and an agitation means 34 which could be a mechanical stirrer, a jet pump, or an air bubbler. The membrane compartment, or envelope, 24, which is described in more detail below, was sealed off with an inlet "lip" 26 at one end and an outlet "lip" 28 at the other end. An inlet tube 30 was attached to the inlet "lip" 26 and an outlet tube 32 was attached to the outlet "lip" 28. The complete assembly was suspended in the synthetic "blood" bath 22.

FIGURE 2 shows the construction of the membrane compartment 24. A cellophane membrane 36, 0.9 mil thick, sold as dialyzer tubing, catalog number 4465–A2, 1¾ inch flat width, by Arthur H. Thomas & Company, was supported by a double layer of 14 x 14 mesh polyethylene screen 38 with a filament diameter of 16 mils.

In practice the dialysate enters the membrane compartment 24 through the inlet tube 30, passes therethrough and out through the outlet tube 32. The dialysate is propelled through the assembly by application of suction at the outlet end. The suction could be applied by any means well known in the art.

The activated carbon is added, preferably as a slurry, to the dialysate to a concentration of up to about 10 percent by weight with 1.5 to 5 percent being the preferred range. It has been found that concentrations of more than about 10 percent may be disadvantageous, due to plugging of the membrane, or excessive apparent viscosity of the slurry. The carbon slurry concentration, however, is determined by the dialysate flow rate.

EXAMPLE 1

In this example the dialysance of the cellophane membrane was determined by using sodium chloride, creatinine, and hippuric acid individually as the solutes in the synthetic "blood" bath. The membrane was about 30 cm. long. Hippuric acid, as used herein, refers to either the acid or a mixture of the acid and the sodium salt of same. The runs were made at 37° C.

The effluent concentration was measured, and the dialysance, K, was calculated from Equation 1.

$$K = \frac{DC_D}{A\left[C - \frac{C_D}{2}\right]} \quad (1)$$

Where

D = dialysate flow rate, cc./min.;
$C_D$ = exit concentration of dialysate;
A = membrane area, m.²; and
C = bath concentration.

This simple equation results since $C_D$ was always much less than C and pure water was used for dialysate.

The results of this example can be seen in FIGURE 3. It is obvious that maximum dialysance is obtained for sodium chloride, creatinine, and hippuric acid at dialysate flow rates above about 150 cc./min. Fifty percent of the maximum dialysance is attained at dialysate flows of 10 cc./min. Determinations at dialysate flows down to about 4 cc./min. have shown a slight further drop in dialysance. It should be noted that dialysance determinations did not correct for the existence of "dead space" in the form of areas of instrument contact between membrane and screen (estimated at about 15–20 percent of the total surface area), the effect of ultra-filtration, or any degree of stretching caused by the vacuum. Since, however, the "dead space" is relatively constant throughout the examples it was determined that corrections were not necessary.

EXAMPLE 2

In this example aqueous solutions containing a single solute were used. Activated carbon was added to the solutions and the amount of solute adsorbed on the carbon was determined. These runs were made at 24° C. These results are shown in FIGURE 4 for creatinine and for hippuric acid. As can be seen, at a concentration in the liquid of 2 mg. percent, the amounts adsorbed are 94 mg./g. of carbon for hippuric acid and 12 mg./g. of carbon for creatinine. It is obvious, then, that creatinine and hippuric acid can be adsorbed in significant quantities, adsorption being particularly effective at lower concentrations. The addition of a fine slurry of activated carbon to dialysate would therefore increase the capacity of dialysate for hippuric acid and creatinine, as well as other adsorbable metabolites, by promoting a continuous adsorption and prolonging the maximum diffusion gradient through the whole length of the tube, even at extremely low dialysate flow rates. The use of very fine activated carbon of a particle size up to 100 microns, but preferably below about 40 microns and for optimum conditions down to 4 to 5 microns, not only approaches equilibrium during a single pass, but also obviates possible clogging of the dialysate compartment. The particle size would depend on the membrane and screen used. The carbon used in these experiments, and which is preferred, as a byproduct ordinarily considered as waste material sold as Darco M. DXL–O–3036, by Atlas Chemical Industries, Inc., Wilmington, Del.

EXAMPLE 3

Equilibrium studies were performed on the preferred activated carbon. To a 1 percent slurry of activated carbon known amounts of creatinine and hippuric acid were added, the mixture was shaken and then filtered at intervals under suction. Almost all of the adsorption occurred within the first 15 seconds. This suggested that the finest activated carbon slurry could be passed through an efficient hemodialyzer just once and be discarded completely. By maintaining a near zero metabolite concentration in the dialysate the original cross-current flow hemodialyzer of Kolobow et al. would be as effective as a countercurrent device.

EXAMPLE 4

Figure 6:
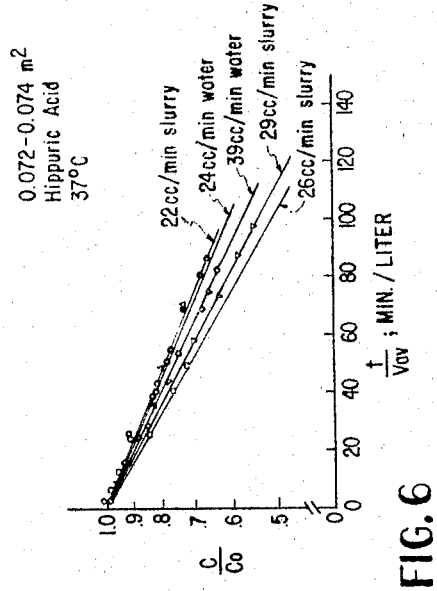

An envelope about 90 cm. long was placed into a 5 liter synthetic, "blood" bath containing either hippuric acid or creatinine. Sodium chloride was added in a number of cases. "Blood" phase agitation was accomplished with an air bubbler. "Blood" was sampled intermittently for changes of solute concentration. FIGURES 5, 6, and 7 show half-times at various dialysate flow rates and membrane surface areas. The dialyzing fluid was either distilled water or 1.5–5 percent by weight activated carbon slurry. In this example, the dialysance values, K. of hippuric acid and creatinine were calculated from Equation 2.

$$\ln \frac{c}{c_o} = \frac{-KAt}{V_{av}} \quad (2)$$

with $t/V_{av}$ at the half-time when $$\frac{c}{c_o} = 1/2 \text{ or } \ln \frac{c}{c_o} = -0.693$$

in those runs in which slurry was employed. Other dialysance values were obtained from Equation 1 or Equation 3.

$$\ln \frac{c}{c_o} = \frac{-KAt}{V_{av}\left[1 + \frac{KA}{2D}\right]} \quad (3)$$

depending on whether or not the exit dialysate concentration was measured. In Equations 2 and 3 an average bath volume, $V_{av}$ is used since the volume decreased somewhat during the course of a run due to ultra-filtration.

It is interesting to note that at the lowest water flow rate employed, 4.5 cc./min., the clearance was calculated to be 4.3 cc./min. indicating at least 96 percent saturation at the strip outlet. Within limits, the effluent dialysate was therefore, identical to ultra-filtrate. The term "clearance" is well-known in the art and should require no explanation. The term "dialysance" is explained here and above by Equations 1, 2 and 3.

Figure 8:
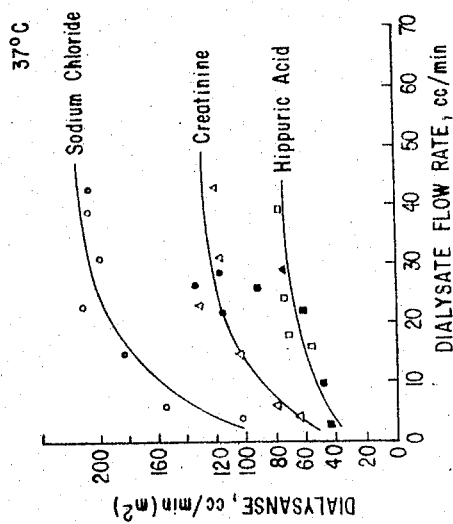
FIGURE 8 is a plot showing dialysance of a membrane to certain substances at ultra-low dialysate flow rates.

In FIGURE 8, open points denote dialysance values obtained with water while blackened points denote those obtained in the presence of carbon slurry. For hippuric acid, little difference is seen in dialysance whether activated carbon has been added to dialysate or not. For sodium chloride a drop in dialysance occurred in the presence of slurry, from 200 to 125 cc./(min.) (m.²) at identical dialysate (slurry) flows of 25 cc./min. Similarly, creatinine dialysance was reduced from about 120 to 75 at dialysate flows of 29 cc./min. These values can be explained by a rise in dialysate compartment resistance due to the presence of activated carbon. It is obvious, however, that even with this drop the dialysance is equivalent to that obtained at a dialysate flow rate of about 500 cc./min. in the prior art.

Figure 9:
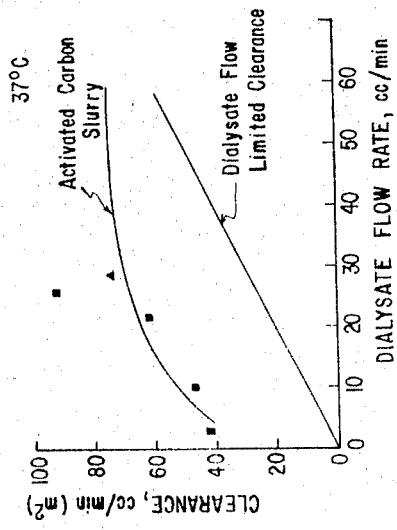
FIGURE 9 is a plot showing clearance versus dialysate flow rate.

FIGURE 9 shows clearance vs. dialysate flow rate as determined from the preceding half-time studies. These are true clearances at all flow rates, as ultra-filtration is properly corrected for by the nature of the experiment. The straight line indicates clearance limited by dialysate flow. At all flows studied, activated carbon overcame the limitations imposed by dialysate flow and exceeded it by a considerable margin. At flows as low as 3 cc./min. a hippuric acid clearance of 42 cc./min. can be obtained, or one-half the maximum clearance for the strip employed based on a 1 m.² surface area. Clearances are uniformly given in cc./(min.) (m.²). Provided dialysate slurry adsorptive capacity remains adequate, clearance per 2 m.² will be doubled. No adjustment was made in net dialysate flow due to ultra-filtration, which was determined separately and found to tbe about 600 cc./(hr.) (m.²), or about 10 cc./(min.) (m.²). In reference to a 1 m.² surface area, an input of 3 cc. of carbon slurry would result in a final exit flow of 3 cc. plus 10 cc. or 13 cc./min. The net result is a slight dilution of the slurry but at the same time a higher efficiency due to greater dialysate flow rate.

All hemodialysate systems in use for patients require relatively large volumes of dialysate per treatment. Dialysate fluid resistance is a significant impediment to efficient operation of a hemodialyzer, and relatively high dialysate flows are required to overcome, at least, partially, fluid film resistance. As can be seen, this invention improves on the artificial kidney system principle of the prior art systems as exemplified by that of Kolobow et al. by achieving maximum dialysance at dialysate flows of 150 cc./min. instead of 900 cc./min. Furthermore, 50 percent efficiency is attained at dialysate flows down to 10 cc./min. Also, the addition of fine activated carbon of a particle size up to 100 microns, more particularly less than 40 microns, or in the preferred embodiment a mean particle size of 4–5 microns to dialysate, increases its capacity for adsorbable metabolites by a wide margin and is especially striking at lowest dialysate flow rates. For example, as mentioned previously, a hippuric acid clearance of 42 cc./(min.) (m.$^2$) is attained at a dialysate slurry flow rate of only 3 cc./min.

Thus, it will now be seen that there is herein provided an improved process of dialysis, more particularly of dialyzing body fluids, which overcomes the disadvantages of the prior art. While the invention has been described with reference to a preferred embodiment it is to be understood that it is in no way to be limited thereto. Many embodiments may be made of the instant inventive concepts, and many modifications may be made of the embodiments hereinbefore shown and described. Accordingly,

What is claimed is:

1. In a continuous process of removing waste material from blood by dialysis of the waste material through an artifical semipermeable membrane to a dialysate lower in concentration of the waste material than the blood, the improvement which comprises augmenting the capacity of the dialysate for the waste material by adding thereto activated carbon of a mean particle size less than about 100 microns in a concentration of less than about 10 weight percent and propelling the augmented dialysate past the artificial membrane at a flow rate of less than about 150 cc./min.

2. The process of claim 1 wherein the waste material comprises adsorbable metabolites.

3. The process of claim 1 wherein the waste material is creatinine.

4. The process of claim 1 wherein the waste material is hippuric acid.

5. The process of claim 1 wherein the waste material is sodium chloride.

6. The process of claim 1 wherein the waste material is a mixture of creatinine, hippuric acid, and sodium chloride.

7. The process of claim 1 wherein said dialysate flow rate is from about 3 to 40 cc./min.

8. The process of claim 1 wherein said activated carbon is present in a concentration of from about 1.5 to 5 weight percent.

9. The process of claim 1 wherein said activated carbon has a mean particle size of less than about 40 microns.

10. The process of claim 9 wherein said activated carbon has a mean particle size of about 4 to 5 microns.

11. In a process of dialyzing blood in an artificial kidney, the improvement which comprises adding a slurry of activated carbon of a mean particle size of about 4 to 5 microns to the dialysate at a concentration of from about 1.5 to about 5 percent by weight, and performing the dialysis at a dialysate flow rate of from about 3 cc./min. to about 40 cc./min.

References Cited

UNITED STATES PATENTS

| | | | |
|---|---|---|---|
| 2,502,614 | 4/1950 | Zender | 210—321 X |
| 2,574,533 | 11/1951 | Cornwell et al. | 210—23 |

FOREIGN PATENTS

| | | |
|---|---|---|
| 452,000 | 8/1936 | Great Britain. |

OTHER REFERENCES

Blaney, et al., "Adsorption: A Step Toward a Wearable Artificial Kidney," from Trans. Amer. Soc. Artif. Int. Organs, vol. XII, pp. 7–11 relied on.

Kolobow et al., "Dialysate Capacity Augmentation at Ultra-Low Flow Rates with Activated Carbon Slurry," from Trans. Amer. Soc. Artif. Int. Organ, vol. XII, held Apr. 8 and 9, pp. 1–5 relied on.

McCaughan, Jr., "A Combined Dialysis-ion Exchange Resin Unit," from Surgery, vol. 56, No. 4, October 1964, pp. 750–756 relied on.

REUBEN FRIEDMAN, Primary Examiner

F. A. SPEAR, JR., Assistant Examiner

U.S. Cl. X.R.

210—321